Figure 1:
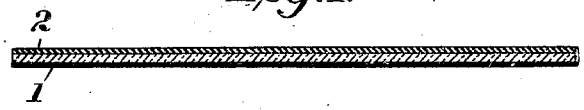

J. HARTNETT, Jr.
PROCESS OF MAKING PLATES FOR PRINTING OR EMBOSSING.
APPLICATION FILED MAR. 5, 1907.

921,397.

Patented May 11, 1909.

Witnesses
J. G. Stinkel
J. J. McCarthy

Inventor
John Hartnett Jr
By Foster Freeman Watson & Coit
Attorneys

UNITED STATES PATENT OFFICE.

JOHN HARTNETT, JR., OF WEST ARLINGTON, MARYLAND, ASSIGNOR TO HARTNETT VULCOGRAPH COMPANY OF BALTIMORE CITY, OF BALTIMORE, MARYLAND, A CORPORATION OF MARYLAND.

PROCESS OF MAKING PLATES FOR PRINTING OR EMBOSSING.

No. 921,397.  Specification of Letters Patent.  Patented May 11, 1909.

Application filed March 5, 1907. Serial No. 360,639.

*To all whom it may concern:*

Be it known that I, JOHN HARTNETT, Jr., a citizen of the United States, and resident of West Arlington, county of Baltimore, State of Maryland, have invented certain new and useful Improvements in Processes of Making Plates for Printing or Embossing, of which the following is a specification.

The object of this invention is to produce relief plates suitable for printing, embossing and other purposes.

The invention is based on the fact that pure crude rubber under certain conditions is sensitive to light and is rendered more or less insoluble by exposure to light and that this property of rubber is increased or intensified by the admixture of a small percentage of asphaltum or coal tar.

In practicing the invention a solution is prepared consisting of pure crude rubber dissolved in any suitable solvent of rubber and to this solution is added a small percentage of asphaltum or coal tar. This solution is prepared and handled in a dark room and is used to sensitize plates which should also be protected from light until used. A plate is coated with one or more films of the above solution according to the amount of relief desired, the films being thoroughly dried before subjecting them to use. It is found that by thoroughly drying the films they are rendered more sensitive. The effect of light, either natural or artificial upon a plate prepared as above is to render the exposed parts of the film more or less insoluble, depending upon the amount of light and the thickness of the film.

A transparency is made of the object to be reproduced in relief. This transparency may be a photographic negative or positive on glass, or any similar translucent representation of the object, a photographic negative being usually preferred. This transparency is placed face to face with the film of the sensitized plate, the two being clamped together in a frame as in the ordinary method of printing photographs. The transparency is then exposed to light, either natural or artificial, for a suitable time, depending upon the intensity of the light, the density of the negative and the thickness of the film. The light will render the parts of the film exposed to it more or less insoluble, depending upon the amount of light passing through the transparency. The film exposed to clear portions of the transparency will be quite insoluble, while the film exposed to shaded portions will be more or less soluble according to the amount of light received through them. After sufficient exposure the plates are separated and the sensitized plate is placed in a bath of any suitable solvent of rubber and subjected to the bath until the parts which were shaded by the transparency have swelled to the desired relief. The amount of swelling or relief at any particular point will depend upon the thickness of the film, the amount of light to which it has been subjected, and the length of time the developing process has continued. When the desired relief has been secured the plate is removed from the bath and a plaster cast made from it, which cast will be found to have the outline and more or less of the relief of the subject from which the negative was made. If it be desired to make an electrotype this plaster cast is dipped in boiling oil (such as linseed oil or paraffin) to fill the pores and then coated with graphite after which an electrotype may be made in the usual manner and stereotype plates may also be made.

Stereotype plates, positive and negative, made as above described, may be used for embossing. For light embossing, such as is required to bring out the features of photographs, the plaster cast above described, together with a negative cast made from the positive, may be used as a pair of embossing dies. Such dies will exactly register with the features of a photograph produced from the original negative and they may be used to emboss pictures printed from the negative.

Figure 2:
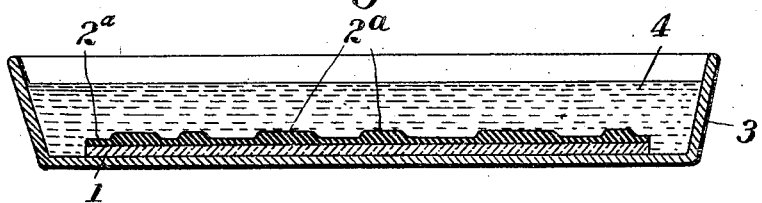
Figure 3:
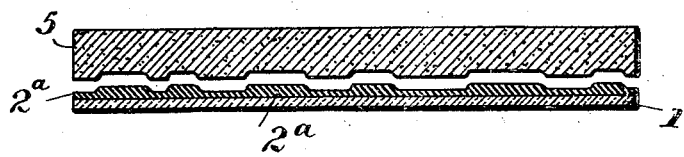
Figure 4:
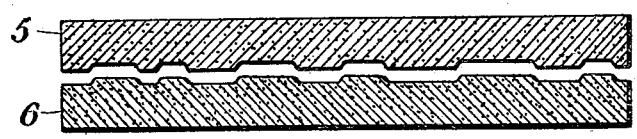

The invention is illustrated in the accompanying drawing in which,

Figure 1 is a sectional view of a plate sensitized with a film of rubber; Fig. 2 is a sectional view of a pan containing the plate after exposure and a solvent or developing fluid; Fig. 3 is a sectional view of the plate after development and a plaster cast made from the plate; Fig. 4 is a sectional view of two complementary plaster casts.

Referring to the drawing, 1 indicates the plate and 2 the film before development.

In Fig. 2, 3 indicates the pan, 4 the developing fluid or solvent and 2ᵃ the film after treatment by the fluid.

In Fig. 3, 5 indicates a negative plaster cast taken from the surface 2ᵃ, and in Fig. 4, 6 indicates a positive plaster cast made from the cast 5, the two being complementary.

It will be evident that my improved process is capable of many uses in the arts. Thus printing plates for reproducing pictures or typographic matter can be produced as well as embossing dies, the process being, in general, applicable to the production of relief plates for any purpose.

Having described my invention what I claim and desire to secure by Letters-Patent is, 1. A method of reproducing an object in relief which consists in sensitizing a plate with a film of pure rubber having a small percentage of asphaltum or coal tar incorporated therewith, exposing said film to light passing through a transparency of the object to be reproduced and then treating said film with a solvent of rubber until the desired relief is obtained.

2. A method of reproducing an object in relief which consists in coating a suitable plate with a film of pure rubber dissolved in a suitable solvent and having a small percentage of asphaltum or coal tar incorporated therewith, exposing said film to light passing through a transparency of the object to be reproduced, and then treating said film with a solvent of rubber until the desired relief is obtained.

3. A method of reproducing an object in relief which consists in sensitizing a plate with a film of pure rubber having a small perecentage of asphaltum or coal tar incorporated therewith, exposing said film to light passing through a transparency of the object to be reproduced, then treating said film with a solvent of rubber until the desired relief is obtained, and making a plaster cast from the said rubber relief plate.

4. A method of making dies for reproducing an object in relief which consists in dissolving pure rubber in a suitable solvent and adding a small percentage of asphaltum or coal tar, then sensitizing a plate by coating it with one or more films of said rubber solution, then exposing said film to light passing through a transparency of the object to be reproduced, then treating said film with a solvent of rubber until the desired relief is obtained, then making a plaster cast of the said rubber film, and then making complementary dies from the said plaster cast in any suitable manner.

In testimony whereof I affix my signature in presence of two witnesses.

JOHN HARTNETT, Jr.

Witnesses:
WILLIAM B. EHLEN,
JAS. S. GOSNELL, Jr.